United States Patent [19]

Fritsch et al.

[11] Patent Number: 4,486,476
[45] Date of Patent: Dec. 4, 1984

[54] PREPARATION FOR MAKING INORGANIC BUILDING MATERIALS WATER-REPELLENT

[75] Inventors: Herwig Fritsch, Gladbeck; Götz Koerner, Essen; Herbert Quilitsch, Heiligenhaus; Eckehard Schamberg, Essen, all of Fed. Rep. of Germany

[73] Assignee: Th. Goldschmidt AG, Essen, Fed. Rep. of Germany

[21] Appl. No.: 597,471

[22] Filed: Apr. 5, 1984

[30] Foreign Application Priority Data

Apr. 11, 1983 [DE] Fed. Rep. of Germany ....... 3312911

[51] Int. Cl.$^3$ .............................................. A23F 3/00
[52] U.S. Cl. ................................... 427/387; 428/447; 528/10; 528/17; 528/18; 524/859; 525/477
[58] Field of Search .................. 528/10, 17, 18; 525/477; 524/859; 428/447; 427/387

[56] References Cited

U.S. PATENT DOCUMENTS 4,408,009 10/1983 Mallon .............................. 524/859
4,413,104 11/1983 Deubzer et al. ..................... 528/10

Primary Examiner—Melvyn I. Marquis
Attorney, Agent, or Firm—Toren, McGeady and Stanger

[57] ABSTRACT

A composition for making building materials water-repellent, before or after they are shaped, the composition containing organoalkoxysiloxanes of the formula

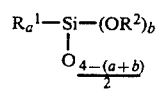

in which $R^1$ is an alkyl or aryl radical, $R^2$ is an alkyl radical with 1 to 4 carbon atoms, $a=0.8$ to 1.5, and b is not greater than 2. The composition contains (a) 1 to 20% by weight of a mixture of organoalkoxypolysiloxanes of the aforementioned formula, 25 to 75% weight of organoalkoxysiloxanes having a b-value of 0.1 to 0.5 (siloxanes A) and 75 to 25% by weight of the organopolysiloxanes having a b-value 0.8 to 2.0 (siloxanes B), and in which the sum of a and b is not greater than 3, (b) 80 to 90% by weight of a water immiscible solvent and, if necessary, (c) known condensation catalysts.

The organoalkoxysiloxane mixture has a surprisingly increased stability on alkaline walling. At the same time, a high depth of penetration and good surface effectiveness are observed.

13 Claims, No Drawings

PREPARATION FOR MAKING INORGANIC BUILDING MATERIALS WATER-REPELLENT

BACKGROUND OF THE INVENTION

1. Field of the Invention

The invention relates to a preparation for making inorganic building materials water-repellent, before or after they are shaped.

2. Description of the Prior Art

The concept of making inorganic building materials water-repellent includes the prevention or reduction of water absorption, as well as the lowering of the surface tension of the building material so that its surface can no longer be wetted by water. Within the scope of this invention, the concept of building materials is understood to include materials which are set by water or carbon dioxide, such as, mortar, plaster, cement; as well as natural, shaped or set building materials or building materials consolidated by baking, such as, sandstone, tiles, pumice stone, molded concrete articles, or walling formed from these. The magnitude of the contact angle of a drop of water is frequently taken to be a measure of the effectiveness of such preparations, see Chemie und Technologie der Silicone (Chemistry and Technology of Silicones), by W. Noll, published by Chemie, 1968, page 387. This contact angle, however, provides no information regarding the amount of water which the treated building material is able to absorb or has absorbed, when it is in equilibrium with a water or water-vapor-containing environment.

In practice, the amount of water absorbed by a building material cannot be determined exactly because it depends on external conditions and on the state of the building material. It is, however, possible to measure the water absorption of a building material under standardized conditions, for example, from its increase in weight, and to obtain in this way a relative measure of the effectiveness of the water-repellent preparation. The purpose is to achieve an effective lowering of the surface tension of the treated building material and as deep a penetration as possible of the impregnating material into the building material and therefore, a lowering of the water absorption by the building material.

For many years, silicone resins have been successfully used for making building materials, such as, sandstone, lime sandstone, mortar, tiles and concrete, water-repellent. The silicone resins are obtained in a known manner from the corresponding silanes through hydrolysis or alcoholysis and condensation. Moreover, the silicone resins are applied to the building material in the form of a diluted impregnating solution. As solvents, hydrocarbons, such as, for example, gasoline, are generally used. Alkyl or aryl groups are linked as the organic groups to the silicone atoms. The methyl silicone resins, which are most easily accessible, are preferred. This state of the art is revealed, inter alia, in German Offenlegungsschrift No. 20 23 976, German Offenlegungsschrift No. 23 56 142 and German Auslegeschrift No. 25 58 184. The use of alkyl radicals with longer hydrocarbon chains has already been recommended for increasing the alkali stability, see "Bautenschutz und Bausanierung," 1980, pages 145 to 147.

The impregnating material must penetrate as deeply as possible into the capillary system of the building material in order to achieve effective water-repellency. However, this ability to penetrate decreases with increasing molecular weight of the silicone resins. Moreover, high molecular silicone resins are not suitable when very dense building materials, such as, for example, concrete, are to be made water-repellent.

German Auslegeschrift No. 20 29 446 also describes the use of organosilanes for directly impregnating walling. Admittedly, these silanes penetrate deeply into the building material. However, they have relatively high vapor pressures, so that they frequently evaporate on the surface of the material before they can condense and/or react with the inorganic building material.

Low molecular siloxanes, when used for impregnating building materials, are washed off from the surface relatively easily, as a result of which, the water repellency achieved is unsatisfactory.

For improving the surface barrier and achieving a high water-beading effect, the addition of fillers, such as, for example, silica with a specific surface area of more than 50 m²/g, has been described in German Offenlegungsschrift No. 25 58 184. However, this filler is also worn away or washed off in time, so that the effect it produces eventually disappears.

Those skilled in the art are therefore still faced with the problem of finding a preparation which, on the one hand, penetrates deeply into the building material, and, on the other, produces a water-beading effect on the surface which is effective for a long time. In addition, a problem arises due to the susceptibility of the siloxanes to hydrolyze on alkaline media, such as, for example, concrete and fresh mortar.

SUMMARY OF THE INVENTION

Surprisingly, it was discovered that these conditions are fulfilled by a composition comprising:

(a) 1 to 20% by weight of a mixture of organoalkoxypolysiloxanes having the formula I

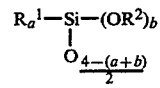

in which
$R^1$ is an alkyl or aryl radical,
$R^2$ is an alkyl radical with 1 to 4 carbon atoms,
$a = 0.8$ to $1.5$, and
$b$ is not greater than 2;
said mixture being composed of
25 to 75% by weight of said organoalkoxypolysiloxane wherein b is from 0.1 to 0.5 designated siloxane A; and
75 to 25% by weight of said organoalkoxypolysiloxane wherein b is from 0.8 to 2.0 designated siloxane B;
and wherein the sum of a and b is not greater than 3;
(b) 80 to 99% by weight of a water immiscible solvent and, if necessary,
(c) a known condensation catalyst.

DESCRIPTION OF THE PREFERRED EMBODIMENT

Especially preferred are preparations which contain as siloxane A, an organoalkoxysiloxane which a "b" value of 0.15 to 0.25, and especially, with a molecular weight of 5,000 to 20,000.

The preferred preparations also include those which contain as siloxane B, an organoalkoxysiloxane with a "b" value of 0.8 to 1.2, and especially, with a molecular weight of 250 to 1,000.

$R^1$ is an alkyl radical, especially with 1 to 4 carbon atoms, the methyl radical being most preferred. $R^1$ can also be an aryl radical, especially a phenyl radical.

$R^2$ is an alkyl radical with 1 to 4 carbon atoms, especially an ethyl radical.

Subscript a has a value 0.8 to 1.5, however, the value $a=1$ is preferred.

The molecular weights given are determined by gel permeation chromatography, polystyrene being used as standard substance.

Organoalkoxypolysiloxanes A and B, contained in the inventive preparations, can be prepared by processes known from the state of the art. For example, an alkyltrichlorosilane, such as, methyltrichlorosilane, is reacted with a water/alcohol mixture, the alcohol corresponding to the formula $R^2OH$. The b-value and the desired molecular weight are achieved by adjusting the alcohol:water ratio and the reaction conditions, and especially, by maintaining a suitable temperature.

Accordingly, the essence of the present invention resides in carrying out the impregnation with a mixture of organoalkoxysiloxanes which differ in their degrees of condensation, rather than with an organoalkoxysiloxane whose molecular weight distribution essentially has only a single maximum. The mixture contains an organoalkoxysiloxane of a relatively high degree of condensation as well as an organoalkoxysiloxane of a relatively low degree of condensation. If the organoalkoxysiloxane mixture, contained in the inventive preparation, is examined by a suitable analytical procedure, e.g., by means of gel permeation chromatography, two pronounced maxima are found in the molecular weight distribution.

Although the organoalkoxysiloxane mixture consists of one part of a siloxane with a relatively low degree of condensation and one part with a relatively high degree of condensation, an average degree of condensation can be determined mathematically. This average degree of condensation corresponds to a value of b from about 0.3 to 1.6 and, preferably, from 0.3 to 0.5.

It was exceedingly surprising that the organoalkoxysiloxane mixture contained in the inventive preparation exhibits excellent stability in the presence of alkali, for example, when applied to an alkaline walling. This is also the case when the $R^1$ group is exclusively the methyl group. If only the high molecular weight siloxane is used, an inadequate depth of penetration, associated with high water absorption and relatively low alkali stability, is observed. If only the low molecular weight siloxane is used, a high depth of penetration is achieved, but only a slight surface effectiveness and also a low alkali stability is observed. The combination, however, exhibits both a clearly improved penetration and alkali stability.

The inventive preparation contains the essential, inventive organoalkoxysiloxane mixture in a solvent which is not miscible with water. Solvents, which are known from the state of the art, such as, gasoline or other industrially available hydrocarbon solvents, may be used.

The preparation may contain known or conventional condensation catalysts, such as, tin dibutyl dilaurate or tetrabutyl titanate, in amounts of 0.1 to 1% by weight, based on the siloxane mixture.

The alkali stability of the organopolysiloxanes on the inorganic building materials can be determined in the following manner. A cube of the inorganic building material, for example, of lime sandstone, with an edge length of 5 cm, is conditioned to constant weight at 20° C. and 60% relative humidity. The cube is then immersed for 60 seconds in the impregnating solution, stored for 1 week at 20° C. and 60% relative humidity for the purpose of curing the siloxane, and then is subsequently placed in 0.1 N KOH. After a specified time, the cube of building materials is removed from the potassium hydroxide solution, freed from liquid adhering to the surface and weighed. The resistance to attack by potassium hydroxide solution is determined by repeating the procedure with storage times of different lengths. The alkali stability of the organopolysiloxane varies inversely with the water absorption.

Water absorption according to British Standard BS 3286, Appendix D, is determined as follows: The test specimens ($100 \times 100 \times 25$ mm) are placed with the side to be impregnated downwards for 15 seconds into the impregnating solution while the opposite side of the specimen, which points upwards, is not impregnated. After a waiting period of 10 days, the water absorption is measured by placing the test specimen with the impregnated side downwards on a moist support. After 7 days, the increase in weight is measured: $a_1 = a' - a_0$ ($a_0$ = weight before moisture absorption, $a'$ = weight after moisture absorption). The test specimens are now turned around and with the side which has not been impregnated facing downwards, placed on the moist support. In the increase in weight is measured after 3 days: $a_2 = a'' - a_0$ ($a_0$ = weight before moisture absorption, $a''$ = weight after moisture absorption). The test specimen is evaluated as follows $(a_1/a_2) \times 100 = A$ [%]. According to the British Standard, the value of A must not exceed 10%.

The water-beading effect is determined optically by allowing drops of water to fall from a height of 20 cm on a surface inclined at an angle of 45 degrees. The beading effect is very good when the drops, which fall on the surface, run off completely without leaving traces of moisture. The beading effect is good when there is only slight wetting of the surface and poor when the water droplets are absorbed by the building material.

The composition of different inventive preparations and their synthesis are shown in the following examples. The beading effect of the inventive preparations are shown and compared with the properties of components of the siloxane mixture.

EXAMPLE 1

(a) A methylethoxysiloxane having an ethoxy content of 12.0% by weight, is prepared from methyltrichlorosilane, ethanol and water. The product therefore corresponds to the formula

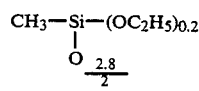

It is a highly viscous liquid.

(b) A methylethoxysiloxane, having an ethoxy content of 43.3% by weight, is prepared from methyltrichlorosilane, ethanol and water. The product therefore corresponds to the formula

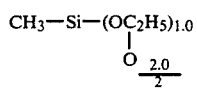

It is a low viscosity liquid.

(c) 100 parts by weight of the methylethoxysiloxane, prepared according to (a), and 73.9 parts by weight of the methylethoxysiloxane prepared according to (b) are mixed, a mixture with an ethoxy content of 22% by weight being obtained. This corresponds to a value of 0.4 for (b) in the mixture used. Now, 10 parts by weight of the siloxane mixture are mixed with 152.8 parts by weight of solvent naphtha and 1 part by weight of tin dibutyl dilaurate (10% by weight in solvent naphtha). The impregnating solution 1 thus obtained, is applied as described and tested. The results are given in the table.

(d) Impregnating solution 2 was obtained by mixing 75 parts by weight of the siloxane prepared according to (a) and 25 parts by weight of the siloxane prepared according to (b) (ethoxy content 19.8% by weight), and mixing 10 parts by weight of the mixture with 156.4 parts by weight of solvent naphtha and 1 part by weight of tin dibutyl dilaurate (10% by weight in solvent naphtha).

(e) Impregnating solution 3 was obtained by mixing 25 parts by weight of the siloxane prepared according to (a) and 75 parts by weight of the siloxane prpeared according to (b) (ethoxy content 35.5% by weight) and mixing 10 parts by weight of the mixture with 130.6 parts by weight of solvent naphtha and 1 part by weight of tin dibutyl dilaurate (10% by weight in solvent naphtha).

EXAMPLE 2

(Comparsion Example—Not in Accordance With the Invention)

A methylethoxysiloxane, having an ethoxy content of 22% by weight was prepared from methyltrichlorosilane, ethanol and water. This siloxane (10 parts by weight) was mixed with 152.8 parts by weight of solvent naphtha and 1 part by weight of tin dibutyl dilaurate (10% by weight in solvent naphtha). Impregnating solution 5, thus obtained, is applied and tested. The results are given in the table.

EXAMPLE 3

(Comparison Example—Not in Accordance with the Invention)

Methylethoxysiloxane (10 parts by weight) from Example 1 (a) is mixed with 169.2 parts by weight of solvent naphtha and 1 part by weight of tin dibutyl diluarate (10% by weight in solvent naphtha). Impregnating solution 6 thus obtained, is applied and tested. The results are given in the table.

EXAMPLE 4

(Comparison Example—Not in Accordance with the Invention)

The methylethoxysiloxane (10 parts by weight) from Example 1 (b) is mixed with 117.8 parts by weight of solvent naphtha and 1 part by weight of tin dibutyl dilaurate (10% by weight in solvent naphtha). Impregnating solution 7 thus obtained, is applied and tested. The results are given in the table.

TABLE 1

Testing of 8 Impregnating Solutions Applied on Lime Sandstone Cubes
The error of measurement is:
Water absorption ≦1.5% ± 0.2
1.5–3.0% ± 0.5
>3% ± 1.0

| | Water absorption in Weight % after Hours of Storage in 0.5 N KOH | | | | | | | | Beading Effect | |
|---|---|---|---|---|---|---|---|---|---|---|
| | 24 | 48 | 72 | 96 | 120 | 144 | 168 | 288 | 7 Days After Application | After 6 Months of Open-Air Storage |
| according to the invention | | | | | | | | | | |
| not impregnated | 10.2 | — | — | — | — | — | — | — | poor | poor |
| impregnating solution 1 b = 0.4 | 0.7 | 1.2 | 1.5 | 2.0 | 2.4 | 2.5 | 2.9 | 3.8 | very good | very good |
| impregnating solution 2 75/25 b = 0.35 | 1.0 | 1.6 | 2.0 | 2.3 | 2.5 | 2.7 | 3.0 | 3.5 | very good | very good |
| impregnating solution 3 25/75 b = 0.75 | 2.0 | 6.1 | 7.3 | 7.4 | 7.6 | — | — | — | very good | very good |
| impregnating solution 4 50/50 b = 0.53 | 0.8 | 1.3 | 1.5 | 2.4 | 2.7 | 2.9 | 3.2 | 3.7 | very good | very good |
| not of the invention | | | | | | | | | | |
| impregnating solution 5 b = 0.4 | 1.4 | 5.1 | 8.0 | — | — | — | — | — | good | poor |
| impregnating solution 6 b = 0.2 | 1.4 | 2.7 | 3.7 | 5.4 | 6.2 | 7.4 | 7.7 | — | very good | very good |
| impregnating solution 7 b = 1.0 | 1.6 | 6.1 | 7.1 | 7.4 | 7.7 | — | — | — | good | poor |
| impregnating solution 8 of the state of the art | 0.5 | 1.2 | 3.6 | 5.8 | — | — | — | — | very good | poor |

(f) Impregnating solution 4 was obtained by mixing 50 parts by weight of the siloxane prepared according to (a) and 50 parts by weight of the siloxane prepared according to (b). The ethoxy content was 27.7% by weight, 10 parts by weight of the mixture being mixed with 143.4 parts by weight of solvent naphtha and 1 part by weight of tin dibutyl dilaurate (10% by weight in solvent naphtha).

TABLE 2

| Water Absorption A [%] According to British Standard BS 3286 | |
|---|---|
| Impregnating solution 2 | 9.2 |
| Impregnating solution 3 | 4.8 |
| Impregnating solution 4 | 4.3 |
| Impregnating solution 6 | 96 |

The results of this test show that the penetration of the impregnating solution 6 is not adequate for achieving low water absorption on natural, lime sandstone, while the inventive impregnating solutions fulfill the requirements of a low water absorption of less than 10%.

We claim:

1. A composition for making building materials water-repellent, before or after shaping of the materials, comprising (a) 1 to 20 % by weight of a mixture of organoalkoxypolysiloxanes having the formula I

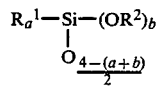

in which $R^1$ is an alkyl or aryl radical,
$R^2$ is an alkyl radical with 1 to 4 carbon atoms,
a=0.8 to 1.5, and
b is not greater than 2;
said mixture being composed of
25 to 75% by weight of said organoalkoxypolysiloxane wherein b is from 0.1 to 0.5 designated siloxane A; and
75 to 25% by weight of said organoalkoxypolysiloxane wherein b is from 0.8 to 2.0 designated siloxane B;
and wherein the sum of a and b is not greater than 3;
(b) 80 to 99% by weight of a water immiscible solvent.

2. The composition of claim 1 which further comprises a condensation catalyst.

3. The composition of claim 1 or 2 wherein siloxane A has a b-value of 0.15 to 0.25.

4. The composition of claim 1 or 2 wherein siloxane A has a molecular weight of 5,000 to 20,000.

5. The composition of claim 3 wherein siloxane A has a molecular weight of 5,000 to 20,000.

6. The composition of claim 1 or 2 wherein siloxane B has a b-value of 0.8 to 1.2.

7. The composition of claim 1 or 2 wherein siloxane B has a molecular weight of 250 to 1000.

8. The composition of claim 6 wherein siloxane B has a molecular weight of 250 to 1000.

9. The composition of claim 1 or 2 wherein $R^1$ is methyl.

10. The composition of claim 1 or 2 wherein $R^2$ is ethyl.

11. The composition of claim 1 or 2 wherein a=1.

12. A method for making inorganic building materials water repellent comprising impregnating the building material with a water-repellent effective amount of a composition for making building materials water-repellent, before or after shaping of the materials, comprising (a) 1 to 20% by weight of a mixture of organoalkoxypolysiloxanes having the formula I

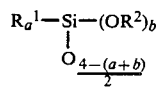

in which $R^1$ is an alkyl or aryl radical,
$R^2$ is an alkyl radical with 1 to 4 carbon atoms,
a=0.8 to 1.5, and
b is not greater than 2;
said mixture being composed of
25 to 75% by weight of said organoalkoxypolysiloxane wherein b is from 0.1 to 0.5 designated siloxane A; and
75 to 25% by weight of said organoalkoxypolysiloxane wherein b is from 0.8 to 2.0 designated siloxane B;
and wherein the sum of a and b is not greater than 3;
(b) 80 to 99% by weight of a water immiscible solvent.

13. Water-repellent inorganic building materials formed by the method of claim 12.

* * * * *